UNITED STATES PATENT OFFICE.

DONALD CLARK, OF BAIRNSDALE, VICTORIA, AUSTRALIA.

PROCESS OF SEPARATING GOLD FROM SILVER AND OTHER METALS.

No. 845,853.      Specification of Letters Patent.      Patented March 5, 1907.

Application filed February 23, 1905. Serial No. 247,017.

*To all whom it may concern:*

Be it known that I, DONALD CLARK, a subject of the King of Great Britain and Ireland, and a resident of Bairnsdale, in the State of Victoria, Commonwealth of Australia, have invented a certain new and useful improvement in the process for the separation of gold from silver and other metals and metallic substances with which it is commonly associated in slimes and in precipitates on zinc or other metals or substances, of which the following is a specification.

This invention relates to an improved process for the separation of gold from silver and other metals and metallic substances with which it is commonly associated in slimes and in precipitates on zinc or other metals or substances.

The slimes or precipitates which I treat by my process are those which in addition to gold contain silver or silver and other metals or metallic substances—such as alloys, compounds, and salts—and by my process the silver (no matter what proportion is present) or the silver and base metals are separated from the gold prior to smelting or amalgamation, and I am enabled to recover the silver in a solution containing little or no free acid and to leave the gold in such a state that it may be readily washed, fluxed off, or amalgamated.

In carrying out my process I take the slimes or precipitates such as are above referred to and remove calcium carbonate or calcium hydroxid (or other salts of calcium,) if such be present, by means of dilute hydrochloric acid, the calcium chlorid so formed being removed by decantation or filtration. Should no soluble calcium compounds be present, this preliminary treatment is not necessary, and even when such compounds are present and such preliminary treatment is not resorted to they only interfere in subsequent operations by increasing the bulk of the insoluble salts present with the gold. After such treatment with dilute hydrochloric acid or without such treatment, if it be omitted, it is well, especially if the slimes or precipitates are not free from coarse metallic fragments and there are present metals, such as zinc, readily attacked by sulfuric acid, to treat the slimes or precipitates with dilute sulfuric acid, whereby the compounds formed of the metals referred to may be removed by washing with water, the liquor containing the soluble sulfates being removed by filtration or decantation, or by both processes. These preliminary treatments are already known and adopted, and I make no special claim therefor except in conjunction with the process hereinafter described; but I may add that in many processes it is the aim to entirely remove the soluble sulfates before smelting, while in my process this is not essential, and in some cases the preliminary treatment is not necessary at all, owing to the substances affected not being present in large quantities or particles. The residual slimes or precipitates, or if these preliminary operations are dispensed with the original slimes or precipitates, are placed in a vessel of porcelain, cast-iron, or other substance not affected by the substances hereinafter referred to and a solution of any salt of the alkalies and sulfuric acid or a sulfate of the alkalies or sulfuric acid alone added and the mixture evaporated to dryness and then heated so as to cake the mass, and so prevent loss by dusting, also to form sulfates with some of the base metals present and to prevent excessive frothing in subsequent operations. Pyrosulfate of sodium is then mixed in the same or similar vessel with the caked product and the whole mixture heated. Instead of pyrosulfate of sodium I find that niter cake or bisulfates or disulfates of the alkalies or sulfuric acid or ammonium sulfate and any salt or compound of the alkalies resulting in the formation of a pyrosulfate or bisulfate will also bring about the desired result.

The amount of pyrosulfate or of niter cake or other such substance to be added will depend on the quantity of base metals and silver present; but in all cases enough must be added to transform these to sulfates. This may be done by adding a slight excess of the material or by regenerating the sodium sulfate which forms with sulfuric acid. The proper amount to use will vary with the different materials to be treated and can easily be ascertained by a few trials. The temperature required lies above that at which sulfuric acid is volatilized, but below that at which the sulfates of the base metals are decomposed in the presence of the pyrosulfate or other such substance. If the mixture is overheated and sulfates are decomposed, then this excessive heating may be corrected by adding more bisulfate or some strong sulfuric acid, when the sulfates will be regenerated. Even where silver sulfate is decomposed, and in some cases it may be desirable to so raise the temperature, the metals may be separated by a method hereafter described.

After fusion the fused product is removed and the soluble salts removed by a water wash. If a small amount of silver is present, it may be wholly removed by washing it out with hot water. If larger quantities are present or the silver sulfate has been decomposed by the heat, the silver can be removed by heating the mass with strong sulfuric acid after the soluble salts of the alkalies and other salts are removed. The silver sulfate readily dissolves, and the clear solution may be poured off and the silver recovered from this by well-known means. The small amount of silver sulfate still remaining with the gold may be washed out with hot water. The silver in all these solutions may be recovered from these solutions in a form from which pure silver may be prepared by well-known means. The insoluble material left after the silver has been washed out may and probably will now, in addition to gold, consist of silicious gangue and insoluble sulfates, such as lead sulfate and calcium sulfate, if the latter had not been removed by the preliminary operation before described. Both lead and calcium sulfates may be removed by first digesting the insoluble material in a hot solution of sodium carbonate until the solution remains alkaline, then washing with water until the solution becomes neutral, then treating the insoluble material with nitric or acetic acid until effervescence ceases, and then washing out the salts of lead and calcium with water. The insoluble material would then only consist of gold and silicious material. The gold may be readily recovered in a pure state by fluxing off the silicious material by smelting. Even when sulfates of lead and calcium and silicious material remains with the gold these may be all readily fluxed out and the gold recovered by smelting.

I prefer instead of fluxing off or otherwise removing these insoluble materials to add mercury and amalgamate the gold present. The greater portion of the gold is in a state which causes it to amalgamate very readily; but some very finely divided gold which is usually present is more difficult to amalgamate. In such cases I therefore add cyanid of potassium, which quickens the action and causes a very speedy amalgamation. Should any fine gold be dissolved during the operation by the cyanid added, then this may be recovered by causing the solution containing it to pass over zinc filaments. The gold will be precipitated in a pure state. After amalgamation has taken place and the cyanid solution washed out the amalgam may be collected from the insoluble material by well-known means and the gold recovered by retorting. The retorted gold may be smelted, when it will be found to be practically pure.

Having now described my invention, what I claim as new, and desire to secure by Letters Patent, is—

1. The process herein described of separating gold from silver and other metals and metallic substances with which it is commonly associated in residuum slimes recovered from prior treatment of crude ores or metals which consists: first, in subjecting such slimes to the action of dilute hydrochloric acid until the compounds of calcium readily soluble in such acid are dissolved and removing the same by a water wash; secondly, subjecting such slimes to the action of dilute sulfuric acid until the coarse particles if any of the metals soluble in dilute sulfuric acid are dissolved and in removing the clear liquid containing the sulfate but not necessarily washing them all out; thirdly, drying such slimes with the addition of sulfuric acid and a soluble sulfate and heating the caked product; fourthly, applying to the caked product a pyrosulfate of the alkalies and heating until the base metals and silver are transformed to sulfates; fifthly, subjecting the fused mass to a water wash to remove sodium salts and the silver if in small proportions, or the silver sulfate has been decomposed by heat; sixthly, removing silver sulfates if present in large quantities by means of sulfuric acid that the gold may be readily removed and collected by amalgamation.

2. In the process herein described of separating gold from silver and other metals and metallic substances with which it is commonly associated in residuum slimes recovered from prior treatment of crude ores which consists in subjecting said residuum slimes to the action of sulfuric acid and a soluble sulfate and heating the product so as to cake the same and afterward subjecting the product to the action of niter cake and heating the same so as to form sulfates of the base metals and silver, afterward washing out such sulfates leaving the silver and insoluble gold readily recoverable substantially as hereinbefore described.

In witness whereof I have hereunto set my hand in presence of two witnesses.

DONALD CLARK.

Witnesses:
LESLIE LAWTON BEAR,
HERMAN HUGO BRIESE.